Sept. 25, 1945. R. J. MONTGOMERY 2,385,368
CABLE SLITTER
Filed June 1, 1942 2 Sheets-Sheet 1
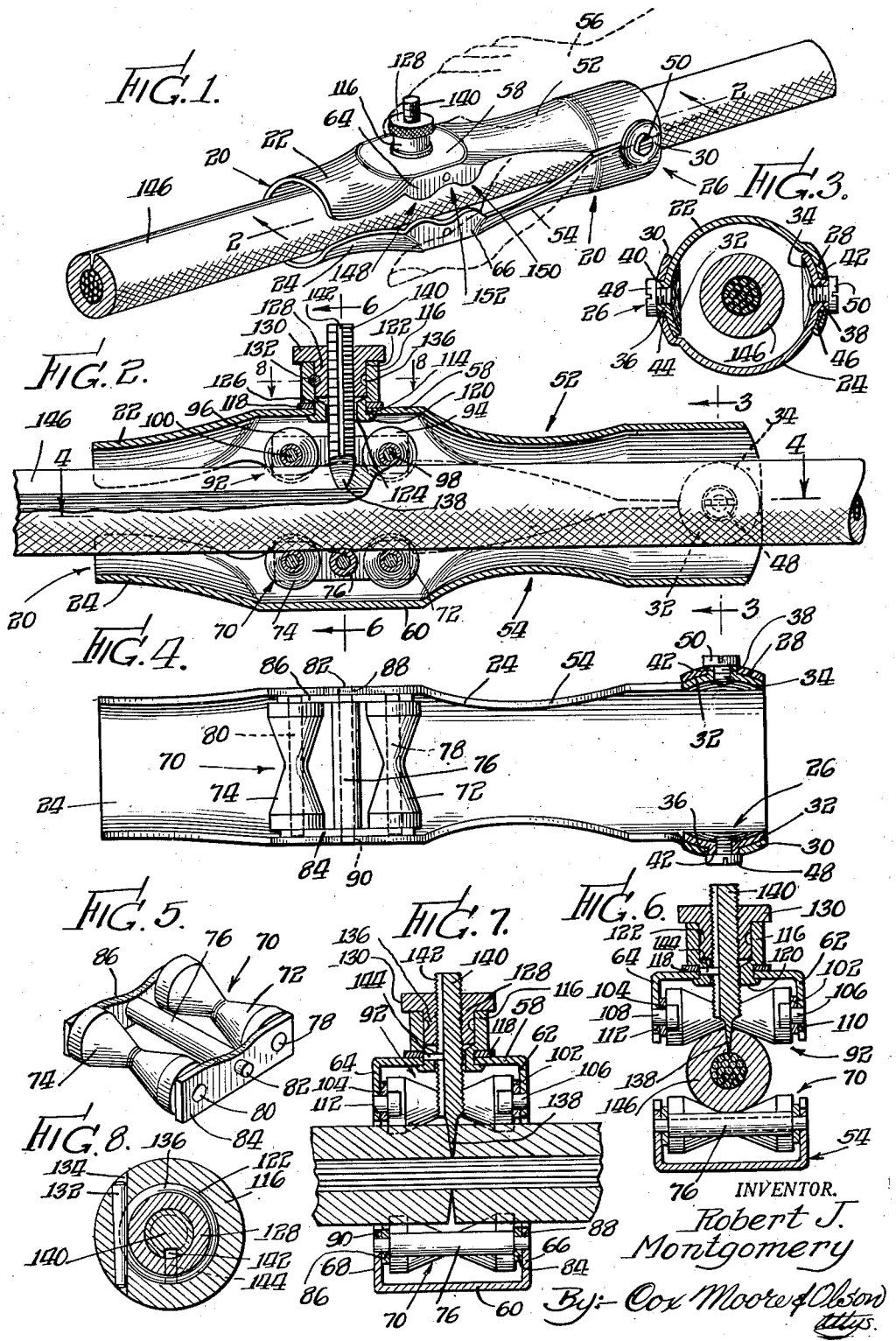
INVENTOR.
Robert J. Montgomery
By: Cox Moore & Olson
Attys.

Sept. 25, 1945.  R. J. MONTGOMERY  2,385,368
CABLE SLITTER
Filed June 1, 1942  2 Sheets-Sheet 2
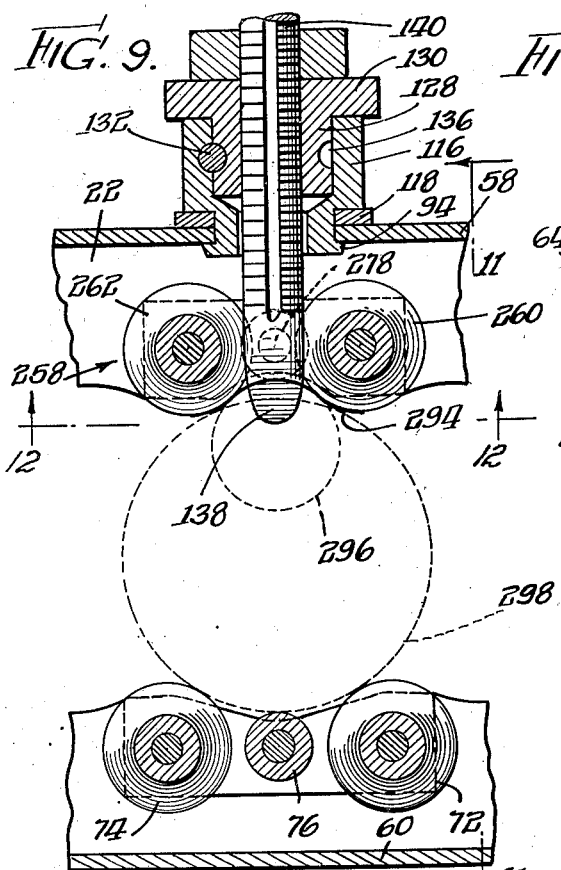
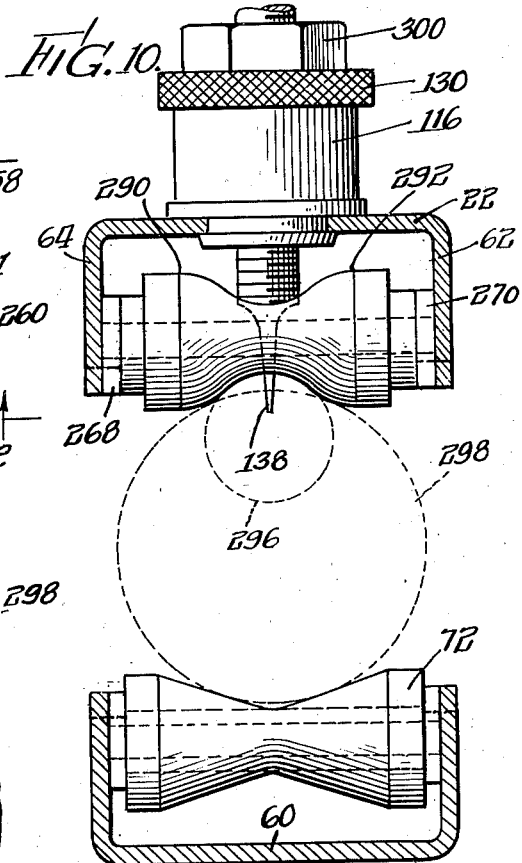
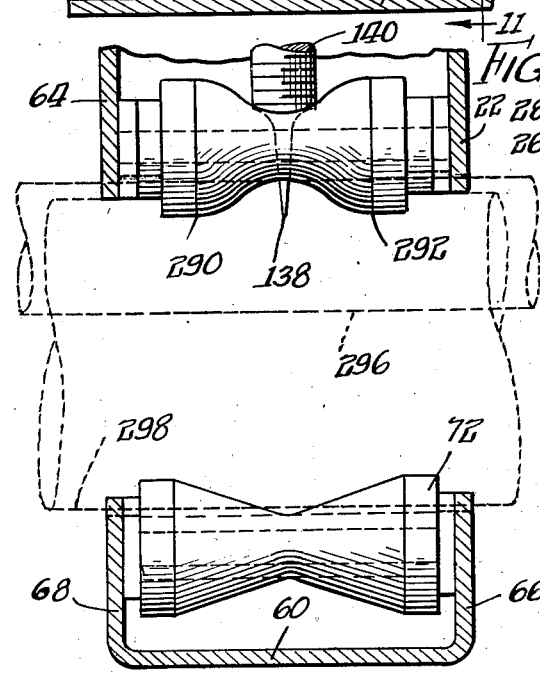
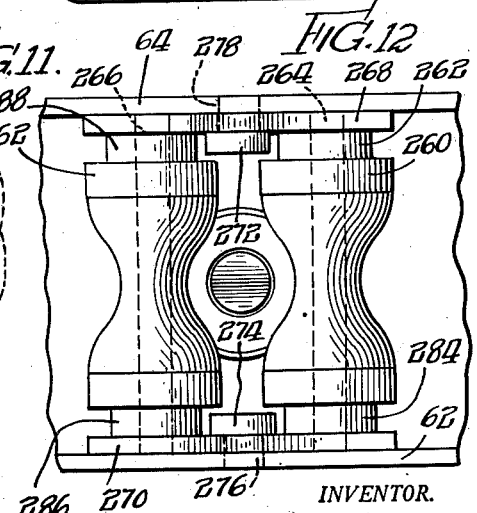
INVENTOR.
Robert J. Montgomery
By: Cox Moore & Olson
Attys.

Patented Sept. 25, 1945

2,385,368

UNITED STATES PATENT OFFICE 2,385,368

CABLE SLITTER

Robert J. Montgomery, Chicago, Ill., assignor to Henrietta G. Montgomery, Chicago, Ill.

Application June 1, 1942, Serial No. 445,330

14 Claims. (Cl. 30—91)

This invention relates to a cutting and slitting device. More particularly it relates to a device for cutting and slitting the insulation on heavy cables to aid in the removal of the insulation.

Cable slitting or stripping devices heretofore known have suffered from a number of disadvantages which have very materially limited their use. Outstanding disadvantages have been that they are limited with respect to the size of the cable they will slit, that they require the exertion of a strong force to retain them in slitting relation to the cable, that they have a very large frictional resistance to movement relative to the cable during the slitting and that they are not readily applied to sever the insulation, either longitudinally or circumferentially of the cable as is required in a good slitter.

It is an object of the present invention to provide an improved device for use in stripping the insulation from cables.

A more specific object is to provide an improved hand cable slitter or insulation cutter which is free of the defects of the prior art slitters noted above.

Another object is to provide an improved cable slitter or insulation cutter which is economical to manufacture and which may be conveniently carried about by the user.

A further object is to provide a cable slitter or insulation cutter which is adapted to slit the insulation or covering on any type of cable and which is easily held in slitting relation to the cable during a slitting operation.

Still another object is to provide a cable slitter having a minimum of frictional resistance to movement with respect to a cable being cut, whereby the slitter and cable are very easily moved relatively during the slitting or cutting of the cable cover.

A still further object is to provide a cable slitter which is adapted to cut a cable covering longitudinally or circumferentially without any adjustment of the slitter.

Still another object is to provide a cable slitter having a cutting member which is adjustable in a direction normal to the axis of the cable and which may also be rotated about a line normal to the axis of the cable and held in either of two positions 90° apart.

Still another object is to provide a device for cutting elongated, cylindrical objects to uniform depth, both cylindrically and axially, and which does not require adjustment of the cutting device in order to make the different types of cuts.

Other objects will appear hereinafter.

It has now been found the foregoing objects are accomplished by providing a device, embodiments of which are illustrated in the accompanying drawings which form a part of this specification and in which, Figure 1 is a view in perspective of a cable slitting or cutting device involving features of the present invention showing the device in use slitting a cable;

Figure 2 is an enlarged detailed section through the axis of the device shown in Figure 1 on the line 2—2 of Figure 1, a portion of the cable insulation being broken away in order to better illustrate the details of the construction;

Figure 3 is a section on the line 3—3 in Figure 2;

Figure 4 is a section on the line 4—4 in Figure 3 but omitting the cable;

Figure 5 is a view in perspective showing one of the roller-carrying portions of the device shown in Figures 1 to 4;

Figure 6 is a section on the line 6—6 in Figure 2;

Figure 7 is a view similar to Figure 6 but showing the device in use for making a circumferential cut in the cable covering instead of a longitudinal cut;

Figure 8 is an enlarged detailed section on the line 8—8 in Figure 2;

Figure 9 is an enlarged partial sectional view of another modification of the invention, the section being taken along approximately the same line as that upon which Figure 2 is taken;

Figure 10 is another enlarged partial sectional view of the modifications shown in Figure 9 and taken along approximately the same line as Figure 6;

Figure 11 is a partial section on the line 11—11 in Figure 9, and

Figure 12 is a section on the line 12—12 in Figure 9.

The slitter or stripper 20, shown in Figures 1 to 8 inclusive, comprises a pair of oppositely disposed arms 22 and 24. For convenience these arms 22 and 24 are made generally similar in size and shape so that, for example, they may both be formed in large part with the same dies. As may be seen, they are generally semicircular in cross section and are hingedly connected together at one end as at 26.

To this end, as seen in Figure 3, semicircular ears 28, 30, 32 and 34 are formed on the opposite sides of each of the arms 22 and 24 adjacent one end. At the axis of ears 32 and 34 formed respectively on arms 22 and 24, bosses 36 and 38 are formed with threaded openings 40 and 42 therein. The other pair of ears 28 and 30, also formed respectively on arms 22 and 24 are provided at the axis of the ears with openings 44 and 46 to receive the bosses 36 and 38. In order that the arms 22 and 24 may be laterally aligned, a circular portion of these arms having approximately the same center and radius as ears 28 and 30, is offset laterally from the rest of the stock of which arms 22 and 24 are formed, a distance approximately equal to the thickness of the stock, as is clearly shown in Figure 3. The hinge assembly is completed by a pair of threaded fasteners 48 and 50 which are threaded into the openings in the bosses 36 and 38 and riveted over on their inner ends, if desired, to provide a permanent assembly. As may be seen, the relatively large heads on the fasteners 48 and 50 extend radially outwardly of the bosses and overlie the ears 28 and 30.

Between the hinge section 26 and approximately the center of slitter 20, arms 22 and 24 are slightly curved inwardly as at 52 and 54. This aids in gripping the slitter 20, for example, in the manner indicated by the hand 56 shown in dotted lines in Figure 1.

Just to the left of the center, lengthwise of each of arms 22 and 24, these arms are provided centrally with flattened portions 58 and 60 which are disposed oppositely to each other in planes approximately parallel with the axis of the hinge 26. On either side of the flattened portions 58 and 60, the edges 62 and 64 of arm 22, and the edges 66 and 68 of arm 24 are turned inwardly at right angles to the flattened portions 58 and 60. From the flattened portions 58 and 60 the arms 20 and 24 again curve slightly inwardly out to the free ends of the arms whereby the slitter 20 may also be gripped on the outer end as well as about the portions 52 and 54.

Referring now more particularly to the arm 24, as shown in Figure 4, it may be seen that a set of rollers 70 shown in perspective in Figure 5 is mounted in the box-like space provided by the flattened portion 60 and the inturned edges 66 and 68. The set of rollers 70 includes a pair of spools 72 and 74 cylindrical adjacent their ends and decreasing in diameter from this cylindrical portion inwardly toward their centers. The spools 72 and 74, and the tube 76 which forms the third roller, are rotatably mounted respectively on rods 78, 80 and 82. The opposite ends of the rods 78, 80 and 82 are fixed in plates 84 and 86. Whereas the rods 78 and 80 terminate at the outer surfaces of plates 84 and 86, the rod 82 extends outwardly beyond these plates and its opposite ends are pivotally received in openings 88 and 90 provided in the inturned edges 66 and 68. By reason of the foregoing construction the spools 72 and 74 can tilt about the axis of the rod 82 in addition to rotating about their own axes. This tilting facilitates the accommodation of varying sizes of cables.

Directly opposite to the set of rollers 70 is another set of rollers 92 mounted in the box-like structure provided by the flat portion 58 and the inwardly extending sides 62 and 64. This set of rollers is generally similar to the set 70 in that it includes spools 94 and 96, identical with spools 70 and 72, and in that spools 94 and 96 are respectively pivotally mounted on rods 98 and 100, which have their opposite ends fixed in plates 102 and 104 and do not extend out beyond the outer surface of these plates. In the set of rollers 92, however, for reasons which will become more apparent as the description proceeds, the roller 76 and rod 82 are replaced by a pair of studs 106 and 108. These studs are fixed respectively in openings in plate 102 positioned in the same place as the openings receiving the ends of rod 82 in the set of rollers 70. The small ends of the studs 106 and 108 extend out beyond the plates 102 and 104 as do the ends of rod 82 and are rotatably mounted in openings 110 and 112 formed respectively in the inturned sides 62 and 64. Thus, although a roller like 76 is omitted from the set of rollers 92, the studs 106 and 108 provide the same type of pivotal mounting which permits the spools 94 and 96 to tilt about studs 106 and 108 as an axis and accommodate cables of varying sizes readily.

Centrally of the flattened portion 58 of arm 22 in alignment with the narrowest portions of the spools 72, 74, 94 and 96 and midway between spools 94 and 96 an opening 114 is provided. Positioned in this opening is a collar 116 having a relatively large upper portion and a shorter lower portion of reduced diameter, which is received in the opening 114. Before the collar 116 is seated in the opening 114 a washer 118 is positioned thereabout and after the collar 116 is positioned in opening 114, the lower end 120 is riveted over, or otherwise secured, in order to firmly mount the collar on the arm 22. Interiorly of collar 116 a relatively large opening 122 is provided in the upper portion which communicates with a smaller opening 124 in the lower portion. As may be seen in Figure 2, for example, the annular shoulder 126, formed where openings 122 and 124 join, is bevelled off for a purpose which will become apparent. Rotatably mounted in the opening 122 is a thumb nut 128, the upper end 130 of which is enlarged and knurled on its outer edge to facilitate the turning thereof by hand. The purpose of the bevelled shoulder 126 now becomes apparent in that the surface forms a relatively frictionless seat for the lower end of thumb nut 128.

Thumb nut 128 is secured against any substantial axial movement, while leaving it free to rotate, by means of a tapered key 132, as best shown in Figure 8. The key 132 is received in a circular opening 134 of slightly decreasing diameter from one end to the other. The axis of this opening is roughly tangential to the surface of the smaller portion of the thumb nut 128 (see Figure 8) and in line with opening 134, an annular groove 136 is provided in the thumb nut 128. After the thumb nut 128 is in position, the key 132 is wedged in opening 134 so that it extends also in groove 136. This leaves the thumb nut 128 free to be rotated but prevents it from moving more than a slight distance in an axial direction.

The purpose of the rotatably mounted collar is to adjust the cutting blade 138. This cutting blade 138 is formed on the lower end of a threaded rod 140, which is threadingly mounted in a threaded opening extending through the thumb nut 128. To prevent the rod 140 and the knife 138 from turning as the thumb nut 128 is turned, the rod 140 is provided with a longitudinally extending groove 142 in which a fixed pin 144 extends. As may be seen in Figure 7, the pin 144 is positioned in an opening formed in the lower portion of collar 116. In assembling the slitter 20, this pin 144 is positioned in the collar 116 prior to inserting the latter into the opening 114 in arm 22. After the collar 116 is positioned in this opening the pin is then held against dislodgement by the stock of arm 22 and by the washer 118. The pin 144 preferably has a relatively tight fit in the collar 116 so that if the rod 140 and knife 138 are completely withdrawn, the pin 144 does not fall out of place.

It will be apparent that since the pin 144 holds rod 140 against rotation it serves not only to keep the cutting blade 138 properly aligned, but also to cause the rod 140 to move axially with respect to the thumb nut 128 as the thumb nut 18 is rotated about its axis. In this manner the cutting knife 138 may be positioned in any desired place, depending upon the size of the cable which is to be cut.

In slitter 20 it is not necessary to change the position of knife 138 in order to slit a cable either axially or circumferentially. As shown in Figure 1 a cable 146 which is to be slit axially is positioned lengthwise in slitter 20 and the two arms 22 and 24 are squeezed down tightly against the cable 146. With knife 138 adjusted, as described above, to the position where it will make the desired cut, the slitter 20 and cable 146 are moved relatively as indicated in Figure 1 to cut the cable covering. It is clear that either the cable 146 or slitter 20, or both, may be moved in making the cut.

Figure 6 shows how cable 146 is guided by the two sets of rollers 70 and 92 and particularly by the spools 72, 74, 94 and 96, which guide the cable 146 into proper alignment with knife 138. At the same time spools 72, 74, 94 and 96, together with tube 76, all being freely rotatable, offer practically no frictional resistance to the movement of cable 146 with respect to them.

In connection with the longitudinal slitting of a cable cover, it is also frequently desirable to make a circumferential cut to completely sever a portion of the cover. Slitter 20 is designed to make such a cut and to do it without any preliminary adjustment. Figure 7 illustrates the manner in which slitter 20 is applied to make such a cut in cable 146. As seen in Figure 1 the inturned edges 62, 64, 66 and 68 all conform generally in shape to the sets of rollers 70 and 92, the edge 64, for example, being curved inwardly as at 148 and 150 opposite spools 94 and 96, leaving an intermediate hollow 152. This configuration of edges 62, 64, 66 and 68 facilitates the use of slitter 20 for making circumferential cuts. More particularly, the cable 146 is received in the hollow 150 and corresponding hollows in other edges 62, 66 and 68 and is supported on the spools 72, 74, 94 and 96 which not only positions cable 146 with respect to knife 138 for the circumferential cut but which also decrease the frictional resistance to rolling of cable 146 or rotation of slitter 20 as indicated in Figure 7.

As may be seen in Figures 2 and 6 the tube 76 positioned directly opposite knife 138 serves as a firm support for the cable 146 at the point where it is engaged by the knife 138. This is true whether the cut be longitudinal or circumferential and aids in obtaining cuts of uniform depth.

Figures 9 to 12 inclusive illustrate a modified roller construction for a slitter such as the slitter 20, shown in Figures 1 to 8. This modified construction is designed to provide for making the same depth of cut both longitudinally and circumferentially of a cable with the same setting of the cutter. The structure shown in Figures 9 to 12 is generally the same as that shown in Figures 1 to 8, the only difference being that the set of rollers 92 is replaced by a set 258 having a somewhat different construction.

As best seen in Figure 12 the set of rollers 258 includes a pair of rollers 260 and 262 rotatably mounted on shafts 264 and 266 which have their opposite ends fixed in plates 268 and 270 and do not extend out beyond the outer surface of these plates. Plates 268 and 270 are pivotally mounted in the same manner as plates 102 and 104. To this end studs 272 and 274 are fixed respectively in openings in plates 268 and 270 with their small ends extending out beyond the plates and rotatably mounted in openings 276 and 278 formed respectively in the inturned sides 62 and 64. This construction permits the spools 260 and 262 to tilt about studs 272 and 274 in the same manner as spools 94 and 96. It will be seen that thus far the construction is generally similar to that of the set of rollers 92.

By comparing Figures 1 to 8 with Figures 9 to 12 it will be seen that the spools 260 and 262 are more closely placed than are spools 94 and 96, so that they overlap the studs 272 and 274. For this reason the opposite ends 282, 284, 286 and 288 of both of spools 260 and 262 are of reduced diameter. This reduces the effective effective length of spools 260 and 262 as compared with spools 94 and 96, but spools 260 and 262 still include a portion adjacent their ends of relatively large diameter and decrease in diameter towards their centers. It will be seen, however, that spools 260 and 262 instead of decreasing in diameter uniformly from their ends inwardly are formed with a curved contour lengthwise. By comparing Figures 9 and 10 it will be seen that the contour of spools 260 and 262 lengthwise is identical between points 290 and 292, as indicated in Figure 10 with the heavy line 294, shown in Figure 9. As may be seen, this line is determined in part by the annular shape of the portions of spools 260 and 262, which has the largest diameter and, in part by the cable 296 shown in dotted lines, which is the minimum size cable for which the slitter 20 is designed to make a uniform cut, lengthwise or circumferentially while knife 138 remains in the same position. It will be apparent that by reason of the fact that the contour of rollers 260 and 262 intermediate points 290 and 292 is the same as that of the line 294, whether the cable 296 be positioned as in Figure 9 for a circumferential cut or as in Figure 10 for a longitudinal cut, the distance from the periphery of cable 296 to the center 298 about which the spools 260 and 262 pivot is the same. Since this pivotal point 298 is fixed on the arm 22 carrying the knife 138 it is apparent that the knife 138 while fixed in a given position will make the same depth of cut into cable 296 whether the cable be extended lengthwise of or across the arm 22, so that both the longitudinal cut and the circumferential cut will be of the same depth. This same relationship will hold for larger sizes of cable as well, such as the cable 298 indicated in dotted lines. More particularly, as the cable 298 illustrates, any size of cable will always contact spools 260 and 262 at some point on the heavy line 294 when positioned as shown in Figure 9 or at some point lying between points 290 and 292 when positioned as illustrated in Figure 10. Furthermore, since the curvature of the line 294 corresponds with the contour of spools 260 and 262 between points 290 and 292, such large sized cable will likewise have its periphery located at the same distance from the pivotal point 298 in either of the two positions mentioned, so that the knife 138 in any given position will make the same depth of cut in such large cable whether it be positioned for a circumferential cut or a longitudinal cut.

The relationship between the black line 294 and the contour of spools 290 and 292 will result in the same depth of cut no matter how much the sizes of the spools and their distance apart may vary and no matter what the minimum diameter of the smallest cable to be accommodated may be with the studs 272 and 274 formed and positioned as shown and with the sides 62 and 64 cut into the depth indicated at 152. The minimum size of cable or the distance between spools 260 and 262 is fixed because these spools must be close enough together in order to engage the cable 296 of minimum diameter. As may be seen, for example, in Figure 9 if the spools 260 and 262 are placed farther apart, the studs 272 and 274, and the sides 62 and 64 will prevent a small cable 296 from contacting both of spools 260 and 262 when positioned as shown in Figure 9.

The manner in which the line 294 is determined can best be explained after it is understood that the maximum diameter of spools 260 and 262 for convenient operation must be kept within certain limits. Thus if the spools 260 and 262 are excessively large an unwieldy structure is provided. It has been found that a diameter of the order of one-half inch is satisfactory for spools 260 and 262. Selecting one-half inch as the suitable diameter, and assuming that the size cable to be cut has a diameter of one-half inch and also assuming studs 272 and 274 are of the size and shape shown and that the sides 62 and 64 are as shown, the proper distance between the centers of spools 260 and 262 is determined by striking arcs from the center of cable 296 on a one-half inch radius, with cable 296 positioned as shown in Figure 9 it must clear the studs 272 and 274 and the edges 62 and 64. The points where these arcs cross a line parallel to the flat portion 58 and extending through the pivotal axis 298 are respectively the centers about which rolls 260 and 262 should rotate. This being determined, the line 294 is then fixed as to length and contour and spools 260 and 262 are then given the same contour and length between points 290 and 292.

The modifications of slitter 20 shown in Figures 9 to 12 also includes another feature which is advantageous where the knife 138 is to occupy a fixed position for making either a longitudinal or circumferential cut on a given size of cable. This additional feature is the lock nut 300. When the lock nut 300 is pulled down tightly against the collar 130, it will be seen that the collar 130 is then prevented from turning with respect to the threaded portion 140 so that the knife 138 is held in a selected position.

The slitter 20 with the rollers 258 therein in place of rollers 92 is employed in the manner already described with the exception that the knife may occupy the same position for making both types of cut on a given size of cable. The set of rollers 70 is shown as the same in both modifications of slitter 20. In order to provide a firm support opposite knife 138, it is preferable that any size cable to be cut engage the tubular roller 76. With the set of rollers 70 constructed as in Figure 5, for example, while any size cable will touch the tube 76, it may not touch both rollers 72 and 74. By giving the spools 72 and 74 a floating mounting, however, it is possible for them to engage any size of cable. Such floating mounting may be provided by positioning the ends or rods 78 and 80 in slots extending along the circumference of a circle centered along the line on which the roller 76 rotates and by providing resilient means such as a spring or springs urging the rolls 72 and 74 away from the flat portion 60 of arm 24. Such springs may, for example, be mounted on this flat portion 60 in line with the rod 76. In this fashion they resiliently urge the spools 72 and 74 away from the portion 60 and at the same time permit these spools to tilt about the axis of rod 82.

The advantages of the present invention have been outlined to some extent in the foregoing description. From this it will be apparent that one of the outstanding features of the construction is that the roller support provided for the cable during slitting reduces frictional resistance to relative movement between the slitter and cable to a minimum. Another advantage common to all forms of the invention is that the rollers are formed and positioned so as to guide the cable into proper position for it to be cut by the knife means provided. In short, the present invention provides a construction wherein the cable is guided and held in cutting position by elements which provide a minimum of frictional resistance to the necessary cutting movement.

An outstanding advantage of the structure shown in Figure 1 is that in this structure it is unnecessary to shift the knife in order to make either a longitudinal or circumferential cut, also the sets of rollers serve to provide a relatively frictionless support for the cable during the making of either type of cut. The provision of two sets of rollers serves to more accurately center the cable and to give more accurate cuts, avoiding damage to the conductor from which the covering is to be removed. Lastly, the structure illustrated in Figures 9 to 12 makes it possible to cut a cable of given size either lengthwise or circumferentially without either pivoting the knife or adjusting it inwardly or outwardly. Other advantages will be apparent from the foregoing description.

The cable slitter described herein may be employed to slit the covering on a wide variety of sizes of cable. The tiltable mounting of the rollers in the form of the invention shown particularly lends itself to the accommodation of such varying sizes of cable.

It is apparent that many widely different embodiments of this invention may be made without departing from the spirit and scope thereof and, therefore, it is not intended to be limited except as indicated in the appended claims.

I claim:

1. A cable slitter and insulation cutter comprising a pair of hingedly connected sheet metal arms, one of said arms carrying cutting means and cable engaging means associated therewith, the other of said arms carrying a second cable engaging means, both said cable carrying means being adapted to engage a cable to be cut, said second cable engaging means being adapted to press said cable into engagement with said cutting means, both said cable engaging means including roller means positioned to engage said cable in the vicinity of said cutting means, said arms being substantially the same in size and shape and having box-like portions in which said cutting means and said cable engaging means are mounted.

2. A device for cutting elongated, cylindrical objects to uniform depth both cylindrically and axially, comprising cutting means, a support for said cutting means and a pair of rollers rotatably mounted on said support and positioned on opposite sides of said cutting means with their axes parallel and substantially equidistant from said cutting means, said rollers being of a size and shape such that an elongated cylindrical object engaging both of them and extending with its axis parallel to their axes is positioned at the same distance from the plane in which said axes lie, as is such object when engaging both said rollers and extending with its axis parallel to a line perpendicular to and extending between the axes of said rollers.

3. A device for cutting elongated, cylindrical objects to uniform depth, both cylindrically and axially, comprising cutting means, a support for said cutting means and a pair of rollers rotatably mounted on said support and positioned on opposite sides of said cutting means with their axes parallel and substantially equidistant from said cutting means, said rollers being substantially symmetrical about their axes and having portions of maximum diameter adjacent their axial ends, the length of each of said rollers intermediate said portion of maximum diameter being substantially equal to the distance between the axes of said rollers and the contour axially of said intermediate portion being concave in the vicinity of the center and convex between the center and said portions of maximum diameter, and said convex portions having substantially the same curvature as the cylindrical surface of said portions of maximum diameter.

4. A device for cutting elongated, cylindrical objects to uniform depth both cylindrically and axially, comprising cutting means, a support for said cutting means and a pair of rollers rotatably mounted on said support and positioned on opposite sides of said cutting means with their axes parallel and substantially equidistant from said cutting means, said rollers being substantially symmetrical about their axes and having portions of maximum diameter adjacent their axial ends, the length of each of said rollers intermediate said portions of maximum diameter being substantially equal to the distance between the axes of said rollers and the axial contour of said intermediate portions adjacent each end thereof, being convex and of substantially the same curvature as the annular curvature of said portions of maximum diameter.

5. A cable slitter and insulation cutter comprising cutting means, cable engaging means associated with said cutting means and adapted to engage a cable to be cut and press said cable into engagement with said cutting means, said cutting means including a shaft, a rotatable collar threadingly engaging said shaft, means including a pin and cooperating slot for holding said collar against axial movement, means for holding said shaft against rotation about its axis and a lock nut threaded on said shaft for locking said collar and shaft against relative movement whereby said cutting means can be locked into any position to which it is adjustable.

6. A cable slitter and insulation cutter comprising a pair of hingedly connected arms, one of said arms carrying cutting means and having a pair of rollers rotatably mounted therein and positioned on opposite sides of said cutting means with their axes parallel and substantially equidistant from said cutting means and the other of said arms carrying cable engaging means adapted to engage a cable to be cut and press said cable into engagement with said cutting means, said cable engaging means including roller means positioned to engage said cable in the vicinity of said cutting means, said first named rollers being of a size and shape such that an elongated cylindrical object engaging both of them and extending with its axis parallel to their axes, is positioned at the same distance from the plane in which said axes lie as is such object when engaging both said rollers and extending with its axis parallel to a line perpendicular to and extending between the axes of said rollers.

7. A cable slitter and insulation cutter comprising a pair of hingedly connected arms, cutting means mounted on one of said arms and cable engaging means mounted on the other of said arms, said cable engaging means including spool supporting means and a pair of spools rotatably mounted on said spool supporting means and respectively engaging a cable to be cut on opposite sides of said cutting means to press said cable into engagement with said cutting means, said spool supporting means being pivotally mounted on said other arm for limited pivotal movement about an axis in alignment with said cutting means.

8. A cable slitter and insulation cutter comprising a pair of hingedly connected arms, cutting means and cable engaging means mounted on one of said arms and a second cable engaging means mounted on the other of said arms, both said cable engaging means including spool supporting means and a pair of spools rotatably mounted on said spool supporting means and respectively engaging a cable to be cut on opposite sides of said cutting means, said second cable engaging means being adapted to press said cable into engagement with said cutting means, each of said spool supporting means being mounted on the associated arm for limited pivotal movement about an axis in alignment with said cutting means.

9. A cable slitter and insulation cutter comprising a pair of hingedly connected arms, one of said arms carrying cutting means and cable engaging means associated therewith, the other of said arms carrying a second cable engaging means, both said cable engaging means including roller means positioned to engage a cable to be cut in the vicinity of said cutting means, the roller means in said first named cable engaging means including two rollers which respectively engage a cable positioned for a longitudinal cut at points located along the line of said cut but on opposite sides of said cutting means and said second cable engaging means being adapted to press said cable into engagement with said cutting means.

10. A cable slitter and insulation cutter comprising a pair of hingedly connected arms, one of said arms carrying cutting means and cable engaging means associated therewith, the other of said arms carrying a second cable engaging means, both said cable engaging means including roller means positioned to engage a cable to be cut in the vicinity of said cutting means, the roller means on said first named cable engaging means including two rollers which respectively engage a cable positioned for a longitudinal cut at points located along the line of said cut but on opposite sides of said cutting means, said second cable engaging means being adapted to press said cable into engagement with said cutting means and said arms being substantially the same in size and shape.

11. A cable slitter and insulation cutter comprising a pair of hingedly connected arms, one of said arms carrying cutting means and both of said arms carrying cable engaging means adapted to engage a cable to be cut when said cable is pressed into engagement with said cutting means, said cable engaging means including roller means positioned to engage said cable in planes parallel to a plane transverse to said arms and passing through said cutting means, said cable engaging means each being arranged for pivotal movement about a transverse axis passing through said transverse plane, said cutting means including a rod keyed to said first arm to hold said rod against rotation about its axis, and means for adjustably securing in position said rod to regulate the depth of cut to be made by said cutting means.

12. A cable slitter and insulation cutter comprising a pair of hingedly connected arms, one of said arms carrying cutting means and cable engaging means associated therewith, the other of said arms carrying a second cable engaging means, both of said cable engaging means being adapted to engage a cable to be cut, said second cable engaging means being adapted to press said cable into engagement with said cutting means, both said cable engaging means also including roller means positioned to engage said cable in the vicinity of said cutting means, each of said cable engaging means including mountings for said rollers pivotally supported in a plane passing through the axis of said cutting means and arranged transversely to the longitudinal axis of said arm, said cutting means including a rod mounted in said first arm for longitudinal movement only, and means for securing said rod in longitudinal adjusted position.

13. A cable slitter and insulation cutter comprising a pair of hingedly connected arms, one of said arms carrying cutting means and both of said arms carrying cable engaging means adapted to engage a cable to be cut when said cable is pressed into engagement with said cutting means, said cable engaging means including roller means positioned to engage said cable in planes parallel to a plane transverse to said arms and passing through said cutting means, said cable engaging means each being arranged for pivotal movement about a transverse axis passing through said transverse plane, said cutting means including a shaft, a rotatable collar threadedly engaging said shaft, means on said first named arm for holding said collar against axial movement, and means including a pin and cooperating slot on said first named arm for holding said shaft against rotation about its axis.

14. A cable slitter and insulation cutter comprising a pair of hingedly connected arms, one of said arms carrying cutting means and cable engaging means associated therewith, the other of said arms carrying a second cable engaging means, both of said cable engaging means being adapted to engage a cable to be cut, said second cable engaging means being adapted to press said cable into engagement with said cutting means, both said cable engaging means also including roller means positioned to engage said cable in the vicinity of said cutting means, each of said cable engaging means including mountings for said rollers pivotally supported in a plane passing through the axis of said cutting means and arranged transversely to the longitudinal axis of said arm, said cutting means including a shaft, a rotatable collar threadedly engaging said shaft, means on said first named arm for holding said collar against axial movement, and means on said first named arm including a pin and cooperating slot for holding said shaft against rotation about its axis.

ROBERT J. MONTGOMERY.